United States Patent
Cimino et al.

[15] 3,688,333
[45] Sept. 5, 1972

[54] DRIVE MECHANISM FOR WINDSHIELD WIPERS

[72] Inventors: James J. Cimino, Bellbrook; David C. Bodem, Kettering, both of Ohio

[73] Assignee: General Motors Corporation, Detroit, Mich.

[22] Filed: May 12, 1971

[21] Appl. No.: 142,603

[52] U.S. Cl. ............15/250.16, 15/250.31, 74/599
[51] Int. Cl. .................................................B60s 1/08
[58] Field of Search.........15/250.16, 250.17, 250.18, 15/250.13, 250.19, 250.27, 250.31; 74/594, 600, 601, 70

[56] References Cited

UNITED STATES PATENTS

| | | | |
|---|---|---|---|
| 2,046,108 | 6/1936 | Drew | 15/250.31 X |
| 2,745,130 | 5/1956 | Oishei | 15/250.27 X |
| 3,588,940 | 6/1971 | Mainka et al. | 15/250.17 |

FOREIGN PATENTS OR APPLICATIONS

| | | | |
|---|---|---|---|
| 853,328 | 11/1939 | France | 15/250.27 |
| 104,000 | 8/1926 | Germany | 74/599 |

*Primary Examiner*—Peter Feldman
*Attorney*—W. E. Finken and W. A. Schuetz

[57] ABSTRACT

In a preferred form, this disclosure relates to a windshield wiper apparatus having a pair of windshield wipers which are adapted to be oscillated across a windshield between inboard and outboard positions during running operation and which are adapted to be moved to a depressed park position when wiper operation is being terminated. The windshield wiper apparatus includes a pair of oscillatable drive pivots to which the wipers are drivingly connected, a drive mechanism having a rotatable output shaft and a crank arm connected to the output shaft and a drive transmission or linkage operatively connected with the crank arm and the drive pivot for oscillating the same to oscillate the wipers. The drive mechanism is operable to rotate the crank arm through a first orbit of the given radius during running operation and is operable to eccentrically move the crank arm to increase the throw thereof to effect movement of the wipers from their inboard position toward their park position when wiper operation is being terminated. The crank arm is a generally U-shaped member having one leg connected to the output shaft and its other leg to the drive linkage and the legs are longitudinally movable relative to each other upon the wiper encountering an obstruction when being moved from their inboard position toward their park position.

2 Claims, 4 Drawing Figures

PATENTED SEP 5 1972  3,688,333

INVENTORS
James J. Cimino &
BY  David C. Bodem
W. A. Schuetz
ATTORNEY

DRIVE MECHANISM FOR WINDSHIELD WIPERS

The present invention broadly relates to a windshield wiping apparatus, and in particular to the windshield wiping apparatus having a pair of windshield wipers which are adapted to be oscillated across the outer surface of the windshield between inboard and outboard positions during running operation and which are adapted to be moved to a depressed park position adjacent the lower edge of the windshield when wiper operation is being terminated.

Depressed park windshield wiper systems usually include a pair of spaced drive pivots rotatably supported by the body structure of the vehicle and to which the wipers are mounted, a drive mechanism including a rotary output shaft, a crank arm attached to the output shaft and a drive transmission or linkage connected with the drive pivots and the crank arm for reciprocating the windshield wipers between their inboard and outboard positions in response to rotation of the crank arm. The drive mechanism of these systems have also included a means for increasing the throw of the crank arm to effect movement of the wipers from their inboard position to a depressed park position adjacent the lower edge of the windshield when wiper operation is being terminated. Cam operated park switches are generally provided for de-energizing the drive mechanisms upon the wipers reaching their depressed park position. These known systems have also included means for de-energizing the wiper motor upon the wipers engaging an obstruction on the windshield which creates a back force in excess of a predetermined magnitude as the wipers are being moved from their inboard position towards their park position. These means have included such things as a yieldable link or linkage and slip clutches which respectively yield and slip to allow the motor to rotate until an associated park switch is opened or thermal overload switches to effect de-energization of the motor when an excessive load is placed on the wiper system. All of these various known means for protecting the windshield wiper system have been satisfactory in operation.

In accordance with the provisions of the present invention, a novel crank arm is provided to accomplish the same end result. The crank arm is of a construction such that should the wipers encounter an obstruction upon their being moved from their inboard position toward their park position which creates a back force in excess of a predetermined magnitude the crank arm will yield to allow the motor to continue to rotate to trip a park switch to de-energize the motor without causing any damage to the windshield wiper system.

Accordingly, an important object of the present invention is to provide a new and improved depressed park windshield wiper system which includes a drive mechanism having a generally U-shaped crank arm operatively connected with the drive transmission and in which the legs of the U-shaped crank arm are longitudinally movable relative to each other upon encountering a force in excess of a predetermined magnitude as the wipers are being moved toward their park position to allow a park switch to be tripped to de-energize the wiper motor.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

Figure 1:
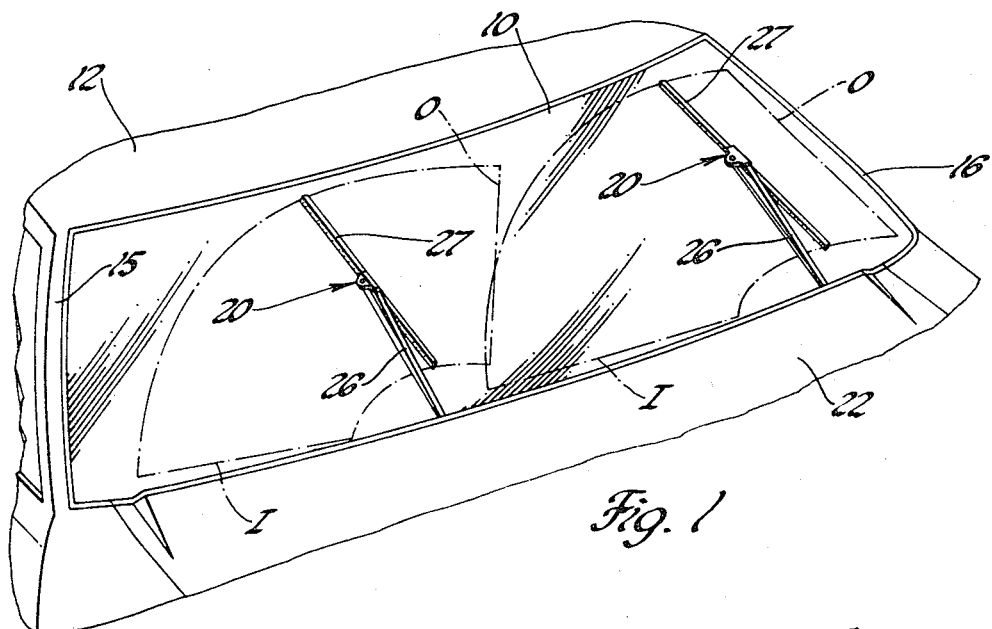
FIGS. 1 and 2 are fragmentary perspective views of an automotive vehicle embodying the novel windshield wiper apparatus of the present invention.

The present invention provides a novel windshield wiper apparatus or system A for wiping a windshield 10 of an automotive vehicle 12. The windshield 10 is supported by suitable body structure 15 of the vehicle and is surrounded by a reveal molding 16.

The windshield wiper system A includes a pair of spaced windshield wipers 20 which are adapted to be oscillated across the outer surface of the windshield 10 between inboard and outboard positions, designated by the letters I and O respectively, during running operation of the wipers 20 and to a depressed park position P on the reveal molding 16 at the lower edge of the windshield 10 when wiper operation is being terminated. In the illustrated embodiment, the wipers 20 when in their park position are in a slot 21 extending transversely of a vehicle 12 so as to be concealed from view. The slot 21 is disposed between the windshield 10 and the rearward edge of a hood 22 of the vehicle. The body structure 15 defines a plenum chamber 23 in communication with the road surface and which has a plurality of spaced apart elongated openings 24 at its upper end in communication with the slot 21. Water, etc., is wiped into the slot 21 and flows through the openings 24 onto the road surface.

It should be noted that the present invention is equally usable with a non-slot concealed depressed park wiper system in which the wipers wipe the water, etc., onto a cowl extending forwardly from the windshield.

The windshield wipers 20 include a wiper arm 26 having spring hinged connected inner and outer wiper arm sections 26a and 26b for urging a wiper blade assembly 27 into engagement with the outer surface of the windshield 10. The inner end sections of the wiper arms 26 are suitably secured to rotatable drive pivots 30 which are rotatably supported within brackets 31 secured to the body structure 15 of the vehicle.

The drive pivots 30 are adapted to be rotated to oscillate the wipers between their inboard and outboard positions I and O during running operation by a drive mechanism 35 which is operatively connected therewith via a drive transmission or linkage arrangement 36. The drive transmission 36 comprises a pair of crank arms 32 having one end connected to the drive pivots 30, a drive link 40 having one end connected via a ball and socket joint 41 to a crank arm 42 of the drive mechanism 35 and its other end connected via a ball and socket joint 44 to the leftmost crank arm 32 and its other end connected by a ball and socket joint 45 to the rightmost crank arm 32.

Figure 3:
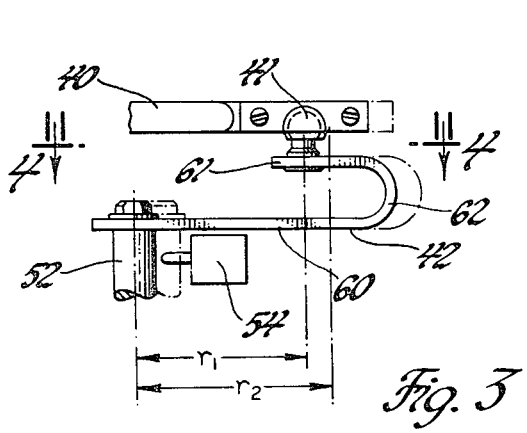
FIG. 3 is an enlarged sectional view taken approximately along line 3—3 of FIG. 2.
Figure 4:
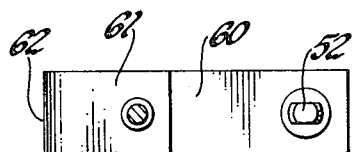
FIG. 4 is a sectional view taken approximately along line 4—4 of FIG. 3.

The drive mechanism 35 comprises an electric motor 50 and gear reduction unit 51 having an output shaft 52 which is drivingly connected to the crank arm 42. The drive mechanism 35 could be of any suitable or conventional construction and since it does not, per se, form a part of the present invention, it will not be described in detail. Suffice it to say that it is preferably of the type shown and described in U.S. Pat. No. 3,253,206, and assigned to the same assignee as the present invention. In the drive mechanism of the aforementioned patent, the output shaft 52 is coupled to the gear reduction unit 51 to rotate the crank arm 42 through a given radius $r_1$ during running operation. When wiper operation is being terminated and the wipers reach their inboard position I, the output shaft 52 is uncoupled from the gear reduction unit 51 and eccentrically moved to increase the radius or throw of the crank arm 42 to radius $r_2$ to move the wipers from their inboard position I to their park position P. The shaft 42 when eccentrically moved to increase the radius of the crank arm to $r_2$ causes a conventional park switch 54 (shown schematically in FIG. 3) to be opened or tripped to de-energize the wiper motor 50.

When wiper operation is initiated the crank arm 42 is eccentrically moved to decrease the radius or throw of crank arm 42 from radius $r_2$ to radius $r_1$ to effect movement of the wipers 20 from their park position to their inboard position I and then the output shaft 52 is coupled to the gear reduction unit 51 to rotate the output shaft therewith and effect rotation of the crank arm about the radius $r_1$ during running operation to move the wipers between their inboard and outboard positions I and O.

In accordance with the provisions of the present invention the crank arm 42 is constructed and arranged such that it will yield when a back force on the wiper system exceeds a predetermined magnitude due to the wipers 20 encountering an obstruction as they are being moved from their inboard position toward their park position so as to allow the output shaft 52 to continue to be eccentrically shifted until it trips the park switch 54. To this end, the crank arm 42 is a generally U-shaped flat spring steel member having its longer leg 60 secured at its free end to the output shaft 52 and its shorter leg 61 secured at its free end to the drive link 40. The legs 60 and 61 extend parallel to each other and are integrally connected at their adjacent ends by a curved bight portion 62.

Figure 2:
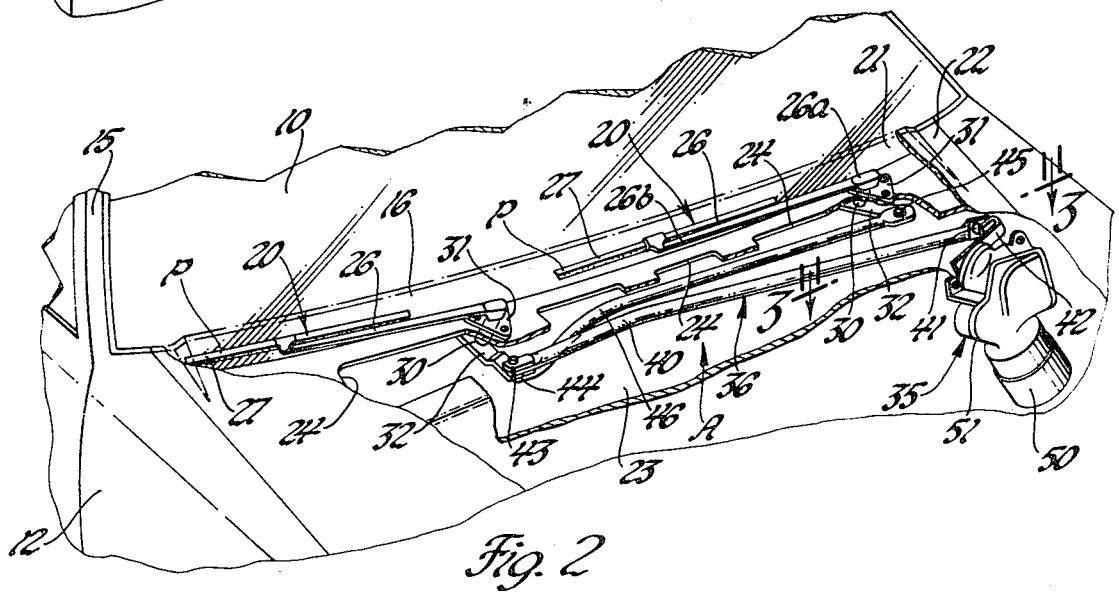

Referring to FIG. 2 it can be seen that as the wipers are moved from their inboard position I toward their park position P the drive link 40 and crank arm 42 are being moved toward the right. If one or both of the wipers 20 were to encounter an obstruction upon being moved from their inboard position toward their park position such that further movement of the wipers 20 cannot take place and hence the drive link 40 cannot be moved toward the right, the legs 60 and 61 of the U-shaped crank arm 52 will move longitudinally relative to each other as the leg 60 continues to be moved toward the right by the shaft 52, which is being eccentrically shifted toward the right. The position of the leg 60 would be between the solid and dotted line portions shown in FIG. 2, while the leg 61 would remain in the position it had when the obstruction was encountered. The solid line position is the relative position of the parts when the wipers 20 are in their relative inboard position. The dotted line position would be the relative position of the parts when the wipers 20 are in their normal park position. This relative movement between the legs 60 and 61 of the U-shaped crank arm 42 allows the eccentric shifting movement of the output shaft 52 to continue and trip the park switch 54 to de-energize the wiper motor 50. The park position of the wipers 20 would then be between their inboard position I and their normal park position P.

From the foregoing, it should be apparent that the yieldable U-shaped crank arm 52 will prevent damage to the windshield wiper system in the event an obstruction is encountered by the wipers 20 which prevents further movement thereof as they are being moved toward their park position.

Although the illustrated embodiment thereof has been described in great detail, it should be apparent that certain modifications, changes, and adaptations may be made in the illustrated embodiment, and that it is intended to cover all such modifications, changes and adaptations which come within the spirit of the present invention.

What is claimed is:

1. A windshield wiping apparatus for an automotive vehicle comprising a pair of windshield wipers which are adapted to be oscillated across the windshield between inboard and outboard positions during running operation and which are adapted to be moved to a depressed park position located beneath the inboard position when wiper operation is being terminated, a pair of oscillatable spaced drive pivots rotatably supported by the vehicle and to which the wipers are drivingly connected, a drive mechanism having a rotatable output shaft and a crank arm connected to said output shaft, a drive transmission operatively connected with said crank arm and said drive pivots for oscillating said drive pivots to oscillate said wipers in response to said drive mechanism rotating said crank arm, said drive mechanism being operable to rotate said crank arm through a first orbit of a given radius during running operation and being operable to increase the throw of the crank arm to effect movement of the wipers from their inboard position toward their park position when wiper operation is being terminated, said drive mechanism including a park switch operatively associated therewith for effecting de-energization of the drive mechanism when the latter has moved the wipers to their park position, the improvement being that said crank arm has a pair of spaced legs integrally connected at adjacent ends of the legs by a curved bight portions, one of said legs being connected to said output shaft and the other of said legs being connected to said drive transmission, said legs being longitudinally movable relative to each other upon said wipers encountering an obstruction when being moved from their inboard position to their park position so as to enable said drive mechanism to increase the throw of the crank arm and to shut off the drive mechanism.

2. In an automotive vehicle having a windshield supported by body structure and a windshield wiping apparatus including a pair of windshield wipers which are adapted to be oscillated across the windshield between inboard and outboard positions during running operation and which are adapted to be moved to a depressed park position located beneath the inboard position when wiper operation is being terminated, a pair of oscillatable spaced drive pivots rotatably supported by the vehicle body structure and to which the wipers are drivingly connected, a drive mechanism having a rotatable output shaft and a crank arm connected to said output shaft, a drive transmission operatively connected with said crank arm and said drive pivots for oscillating said drive pivots to oscillate the wipers in response to said drive mechanism rotating said crank arm, said drive mechanism being operable to rotate said output shaft and said crank arm through a first orbit of a given radius during running operation and being operable to interrupt the driving connection therebetween and eccentrically move the output shaft to increase the throw of the crank arm to effect movement of said wipers from their inboard position towards their park position upon the wipers reaching their inboard position when wiper operation is being terminated, the improvement being that said crank arm is a generally U-shaped member having a pair of spaced legs integrally connected at their adjacent ends by a bight portion and with one of said legs being connected to said output shaft and the other of said legs being connected to said drive transmission, said legs of said generally U-shaped crank arm being movable longitudinally relative to each other upon said wipers engaging a resistance in excess of a predetermined magnitude upon being moved from their inboard position toward their park position so as to allow said drive mechanism to continue to eccentrically shift the output shaft until said park switch is tripped to de-energize the drive mechanism.

* * * * *

PO-1050
(5/69)

UNITED STATES PATENT OFFICE
CERTIFICATE OF CORRECTION

Patent No. 3,688,333      Dated September 5, 1972

Inventor(s) James J. Cimino and David C. Bodem

It is certified that error appears in the above-identified patent and that said Letters Patent are hereby corrected as shown below:

Column 2, line 66 "44" should read --43--; line 66 after "32" insert --and a cross or follower link 46 having one end connected by a ball and socket joint 44 to the leftmost crank arm 32--.

Column 4, line 1, delete "relative".

Signed and sealed this 6th day of February 1973.

(SEAL)
Attest:

EDWARD M. FLETCHER, JR.      ROBERT GOTTSCHALK
Attesting Officer      Commissioner of Patents